April 9, 1968 A. H. LIPPERT 3,377,435

LAND-TO-MOBILE TELEPHONE LINK

Filed April 30, 1964 5 Sheets-Sheet 1

BLOCK DIAGRAM OF THE TSTA UNIT 55

INVENTOR.
A. H. LIPPERT
BY
[signature]
ATTORNEY

United States Patent Office 3,377,435

Patented Apr. 9, 1968

3,377,435

LAND-TO-MOBILE TELEPHONE LINK

Anthony H. Lippert, Chicago, Ill., assignor to International Telephone and Telegraph Corporation, New York, N.Y., a corporation of Maryland Filed Apr. 30, 1964, Ser. No. 363,851

15 Claims. (Cl. 179—41)

ABSTRACT OF THE DISCLOSURE

A land-to-mobile telephone link is provided between central office equipment and radio links to enable direct dial control connections to be made between a central office and mobile stations. The link makes it possible by dialing to interconnect land subscribers and mobile subscribers or to interconnect two mobile subscribers.

This invention relates to land-to-mobile telephone systems and more particularly to links for converting the signals used in one of the systems into signals used in the other of the systems, and vice versa.

Almost any telephone system may be defined broadly as a switching network for selectively interconnecting two or more subscriber lines responsive to switch directing or control signals transmitted by either a calling subscriber or an operator. In many conventional land or immobile telephone systems, these control signals are usually transmitted in the form of D.C. pulses. Since the subscriber lines are separated in space, the dial pulses may be used in a well-known manner to drive electro-mechanical switches for selecting a particular point in space and, therefore, a particular subscriber line.

Contrast this conventional operation with a mobile telephone system which must rely upon a limited number of radio links to interconnect a land based system and any one of many mobile subscriber stations. Thus, it is not enough to simply select a single point in space; all of the many mobile subscribers must share the same few links. The system must also select one of many mobile subscribers and must do so responsive to signals which are transmitted over the radio link channels. A result is that the signalling becomes much more complex. Moreover, the limited radio facilities must be given priority and released promptly in order to not to waste their limited capabilities. Since all subscribers in either the land or mobile system must be able to complete a call over any idle radio channel, a sophisticated (as compared with conventional land signalling) signalling plan must be provided.

Accordingly, an object of this invention is to provide new and improved land-to-mobile telephone links. In this connection, an object is to provide means for converting signals used in either of the two systems into signals which are usable in the other of the two systems.

Another object of the invention is to utilize the limited capacity of the radio links to the fullest extent possible. Thus, an object is to give priority to mobile calls. Furthermore, an object is to release the radio link as soon as possible.

Yet another object is to supply the supervision signals required for calls between the land system and the mobile system. Here an object is to automatically supply a numerical identification of the mobile station participating in a cell.

In accordance with one aspect of this invention, a land-to-mobile telephone system comprises a plurality of link circuits interposed between a conventional central office switching system and a plurality of radio links for serving mobile telephone stations. The link includes switches for connecting a line circuit in the central office to any radio channel leading to a mobile subscriber station. As part of this function, the link circuit is adapted to receive service demand and switch directing signals from the central office and to convert them into frequency or tone signals usable at the mobile station. In like manner, the link receives frequency or tone demand and switch directing signals from the mobile station and converts them into signals which are usable in the central office. In addition, the link circuit provides supervisory functions such as causing mobile subscriber ringing and ring trip during mobile station called conditions and priority demand and acknowledge during mobile station calling conditions.

The above mentioned and other objects and features of this invention and the manner of obtaining them will become more apparent, and the invention itself will be best uderstood by reference to the following description of an embodiment of the invention taken in conjunction with the accompnaying drawings, in which.

Figures 1, 2:
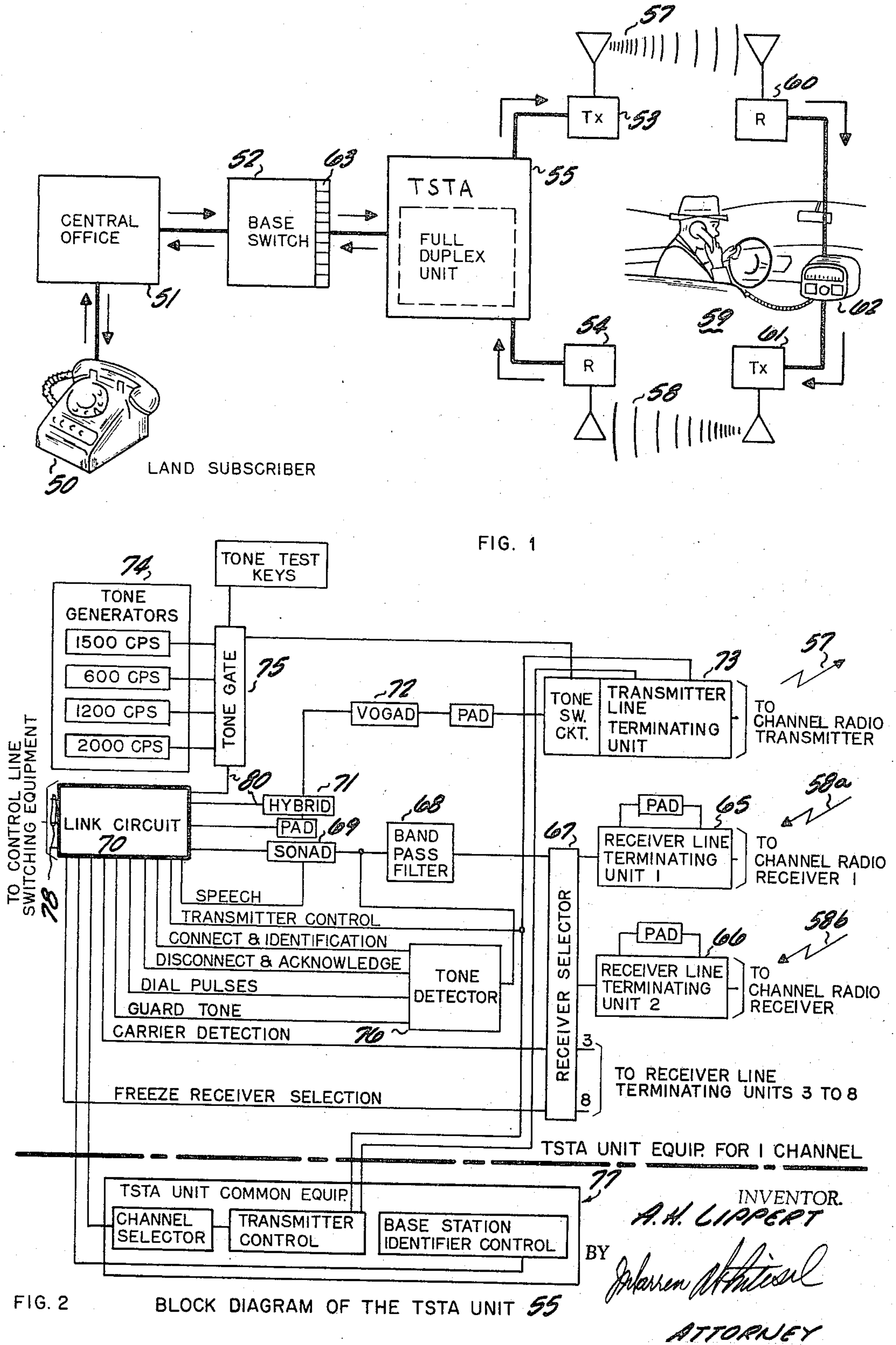
FIG. 1 is a simplified block diagram showing an entire land-to-mobile telephone system.
FIG. 2 is a block diagram showing the construction of a system utilizing the invention.
Figure 3:
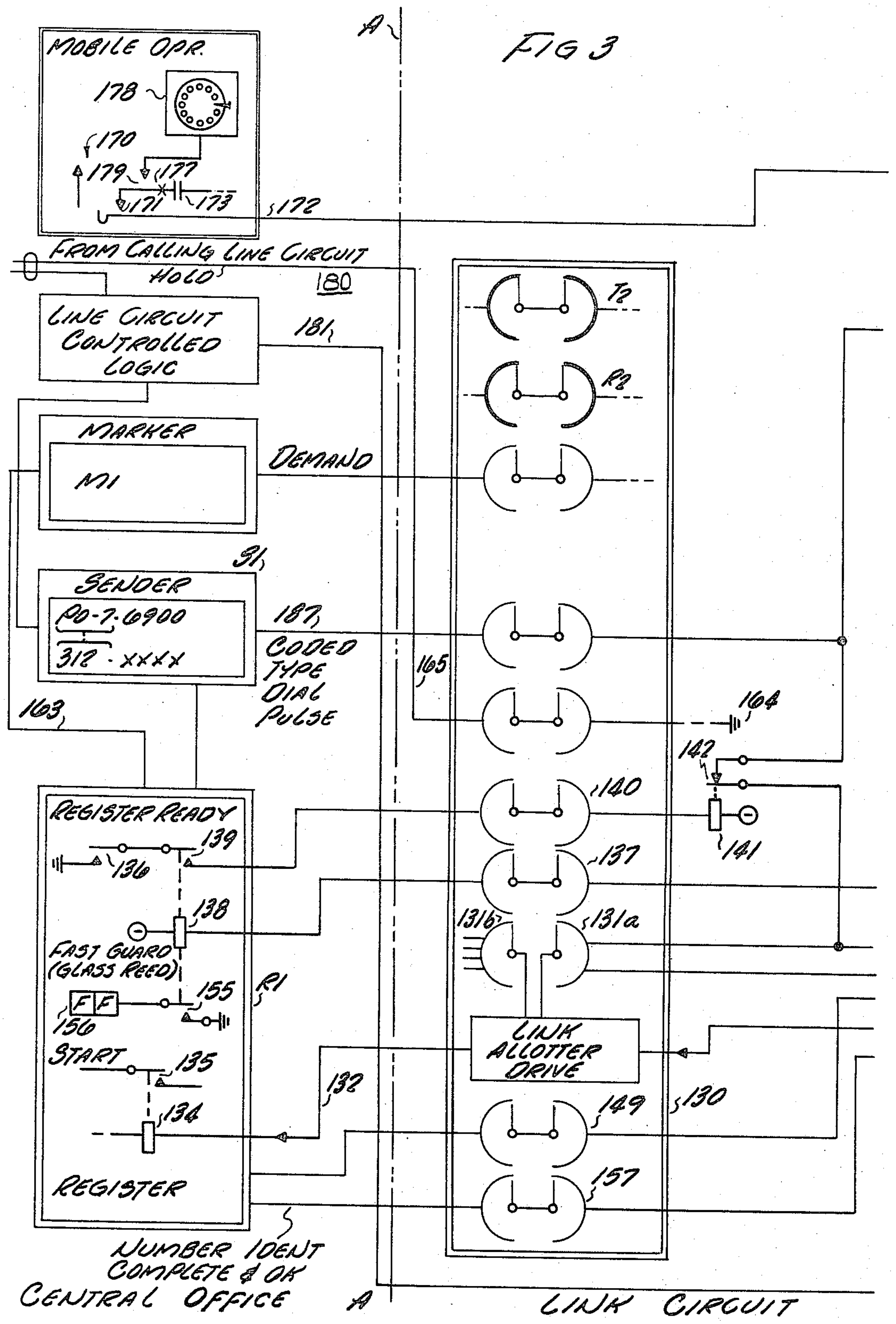
Figure 4:
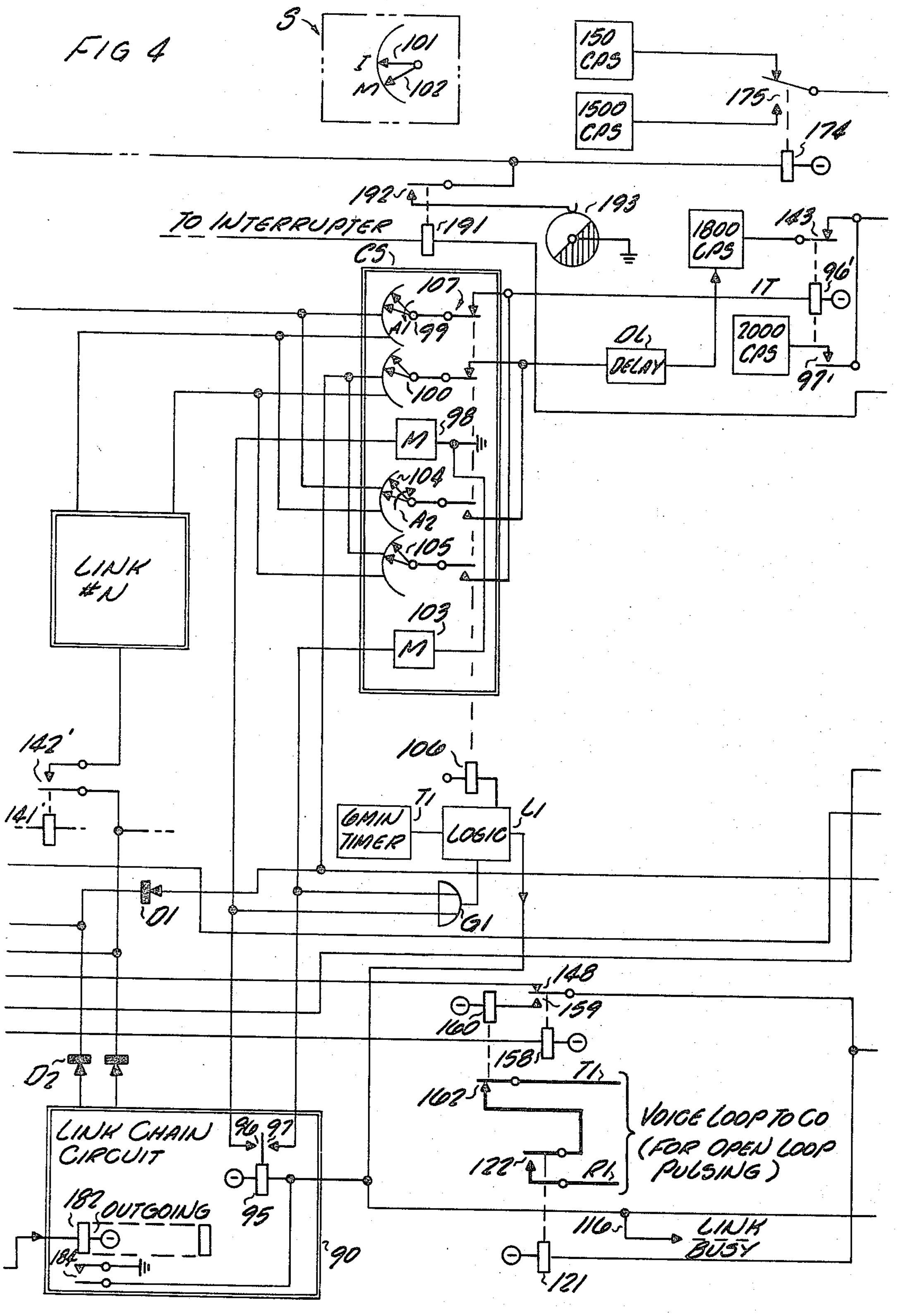
Figures 5, 6:
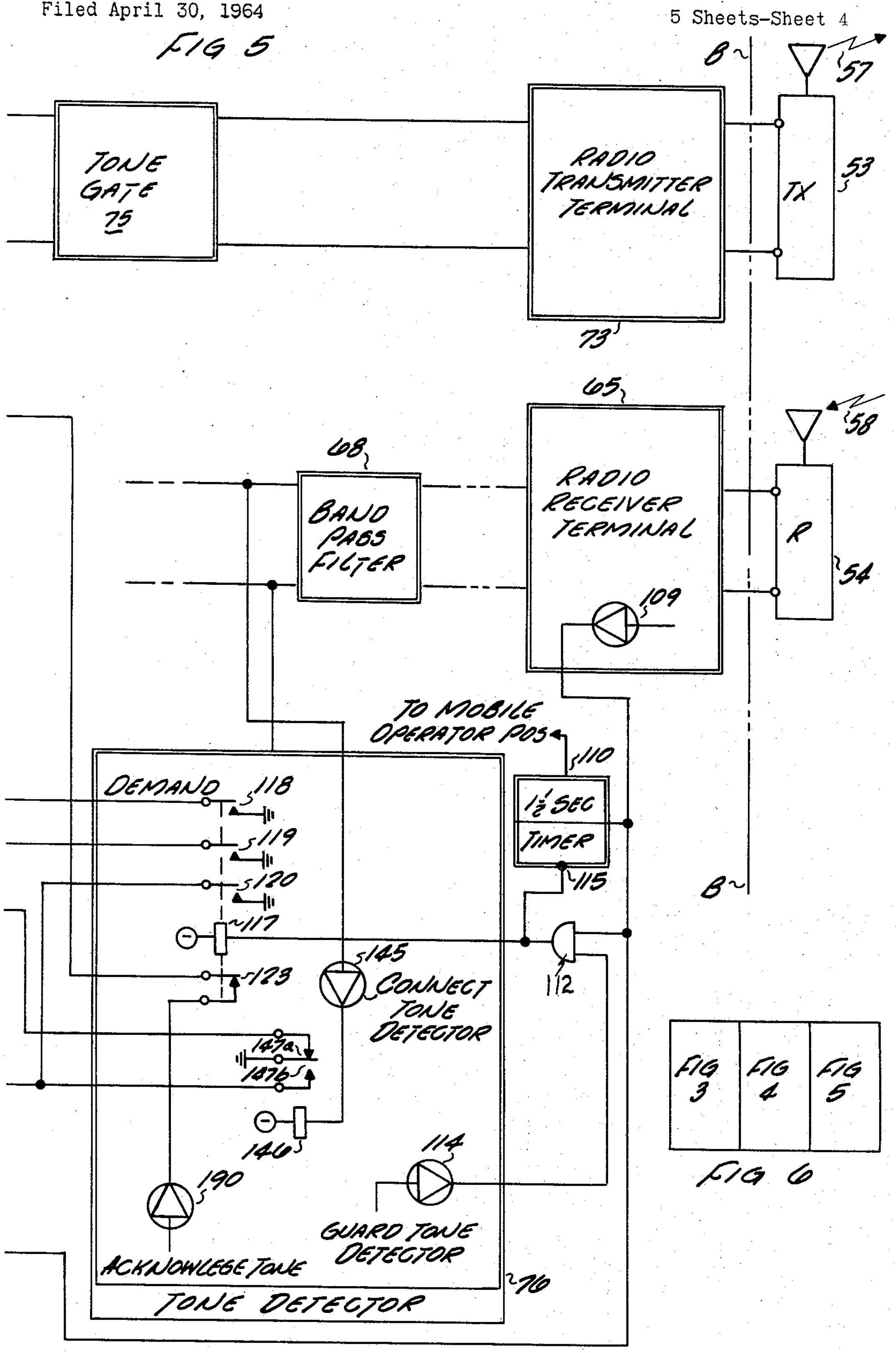
Figure 7:
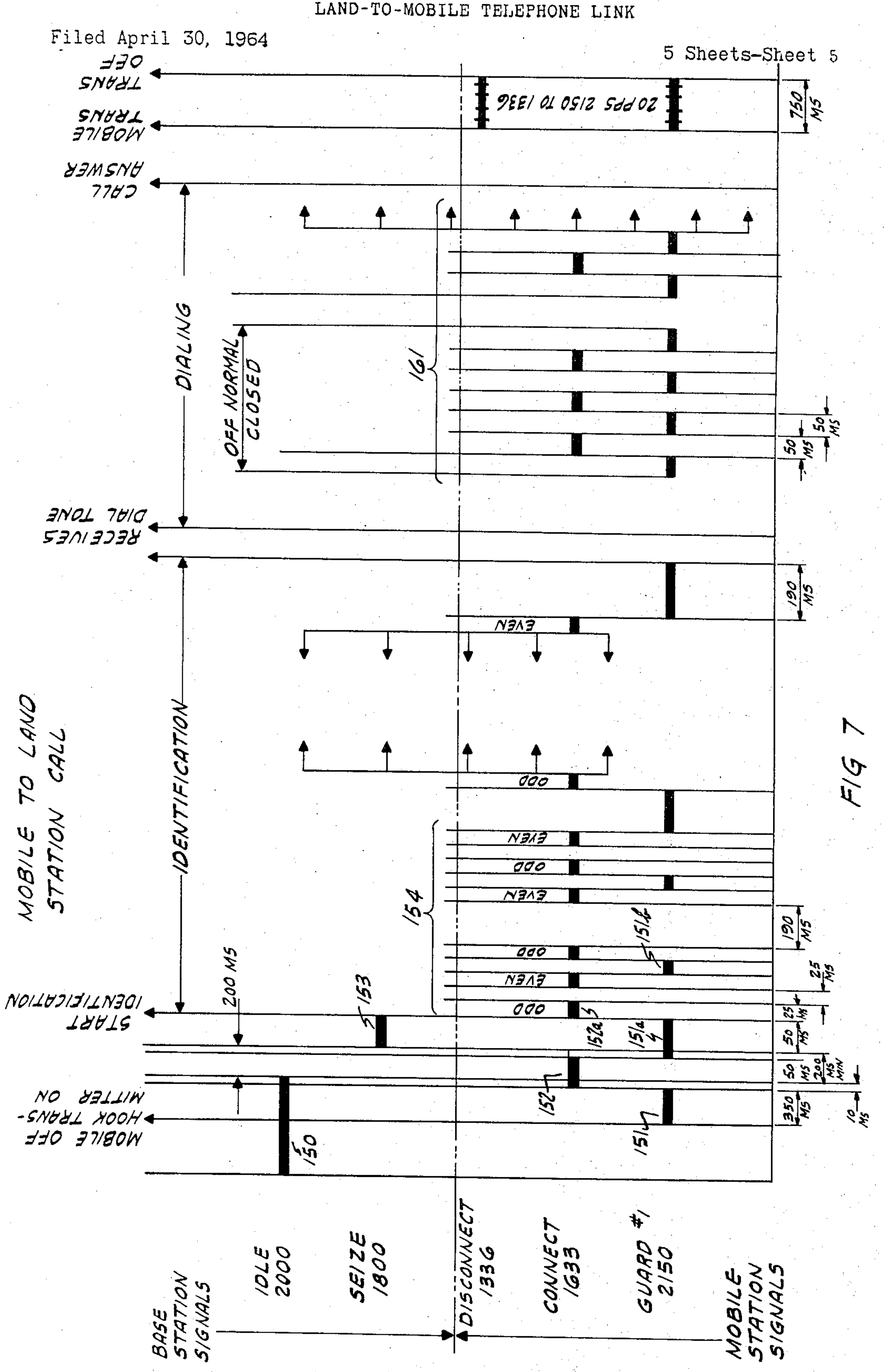

FIGS. 3–5 form a skeletonized circuit showing the logic of the link circuit of FIG. 2 together with portions of interfacing circuits;

FIG. 6 shows how FIGS. 3–5 should be joined to provide a complete and understandable circuit; and FIG. 7 is a graph which shows how a parity check is accomplished when the mobile station sends signals to the central office.

The complete land-to-mobile telephone system of FIG. 1 includes a plurality of land based subscriber stations (symbolically shown at 50) coupled to initiate or receive calls to or from a central office 51, of any convenient design. For mobile service, the central office is connected through a two-way trunk line to a base switching station 52. This base station is, in turn, coupled to a radio transmitter 53 and receiver 54 via transmission signalling and test access equipment 55 (commonly abbreviated "TSTA"). The receiver and transmitter have access to a plurality of radio link channels symbolically shown at 57, 58. The mobile subscriber station 59 includes a receiver 60 and a transmitter 61, a mobile selecting and identifying switching device (not shown) and a telephone instrument 62. This instrument is commonly called a "control head."

The central office 51, which is not part of the present invention, processes calls to and from both land and mobile subscriber stations in the same manner. The land-to-mobile system provides parity checking, and the central office provides toll billing.

The base station 52 embodies well known switching equipment of any suitable type. In one exemplary system, it used common controls, crossbar switches and packaged relay units. Any number (up to 480 in the exemplary system) of mobile subscriber line circuits (symbolically shown at 63) are provided. Each line circuit represents a mobile subscriber station in a manner which is somewhat as a conventional line circuit represents a land based subscriber station. The exemplary system had eight radio channels, 57, 58 each of which may be connected to any line circuit 63 via a switch and two wires.

The TSTA equipment 55 is of a modular design and provides for maximum flexibility in system application. The simplest installation (using the exemplary system equipment) is a two channel arrangement comprised of one TSTA unit which includes two full duplex transmission units. The maximum eight channel installation can be provided with an additional two TSTA bays.

The transmission signalling and test access equipment 55 performs all logic functions connected with call processing for all types of calls to and from the automatic mobile system. There is an automatic identification of the calling mobile subscriber station and an automatic channel assignment (on a next idle channel basis). At the end of calls, a base station identification is sent from the transmitter 53 in a manner which complies with FCC regulations.

FIG. 2 gives a more detailed description of the transmission signalling and test access (TSTA) equipment 55.

The principal items in the TSTA equipment include up to eight receiver line terminating units 65–66; receiver selector equipment 67; a band pass filter 68; a sound operated noise antennuating device 69 (commonly termed SONAD); a plurality of link circuits 70; a hybrid circuit 71; a voice operated gain adjusting device 72, (commonly termed a VOGAD); and a transmitter line terminatnig unit 73. Tone oscillators 74, a tone gate 75 and a tone detector 76 are commonly associated with the major items 65–73 and cooperate therewith for carrying out the signalling required to establish and maintain a call connection. In addition, common control equipment 77 serves all of the TSTA equipment.

Briefly, the equipments 65–76 provide the following functions:

The link circuit 70 controls the logic functions required during a call by providing the channel tone and the switching signals which are sent to either an assocated line circuit or a mobile subscriber station. The details of the logic in the link circuit 70 are described in FIGS. 3–5.

The tone generator circuits 74 generate the frequencies sent over the radio channel 57, for digit out-pulsing, channel marking, and any other required supervisory signals. The tone gate 75 extends signalling tones from the channel tone generators 74 to the transmit radio channel 57.

The tone detector circuit 76 may be of any well-known type provided that it recognizes tones of various frequencies and sends corresponding indications to the link circuit 70 for control purposes.

The channel selector and other items in the common control equipment 77 control the selection of channels and the transmission of identification codes.

The remaining equipment in FIG. 2 is explained in greater detail in a U.S. patent application entitled "Mobile Radio Telephone System," Serial No. 345,154 now abandoned, filed by George Curtis on February 17, 1964, and assigned to the assignee of this invention.

To illustrate the system more clearly, assume that the land subscriber station 50 (FIG. 1) is coupled for conversation with the mobile subscriber station 59. The talking path includes a two-wire connection 78 (FIG. 2) from the land subscriber station 50 through the central office 51 and base station 52 to the TSTA equipment. There a two-wire line 80 interconnects the link 70 with the hybrid circuit 71, the transmit unit 73 and the radio link channel 57 of the TSTA equipment. The mobile subscriber station 59 receives the signals sent over channel 57 and returns signals over channel 58 to the land based TSTA station. There, the signals are forwarded to the land subscriber station 50 via the hybrid circuit 71.

The hybrid circuit 71 and associated balancing pad diverts the incoming voice signals to the two-wire line 78 through the link circuit 70. Ultimately these signals reach the land subscriber station 50. During this transmission of voice signals, a low level of leakage sigals may pass through the hybrid circuit 71 and be sensed by the VOGAD circuit 72. These leakage signals are then amplified, as sidetone signals, and transmitted over channel 57 to the mobile subscriber station 59.

In keeping with an aspect of the invention, the link 70 is interposed between the central office 51 and the plurality of radio lniks 57, 58. The link includes means for converting signals between the type of signals required to control and supervise equipment in the central office and the types of signals required to control and supervise the station selector switches (not shown) in the mobile units.

The nature of the link circuitry utilized for providing these functions will be clear from a sutdy of FIGS. 3–5. When joined as shown in FIG. 6, these FIGS. 3–5 show the logical essence of a link circuit and the interfacing circuits coupled thereto. Generally, the link functions are shown between a pair of vertical dot-dashed lines A–B. The central office interfacing equipment is shown to the left of line A, and the radio interfacing equipment is shown to the right of line B.'

The hollow boxes in these figures represent units of equipment which are well known to those skilled in the art. Most of these units will be recognized by their names alone. However, one which may deserve a special word is the link chain circuit 90 which is a circuit for enabling a single link to operate when mobile stations are being called and for inhibiting all other links while the call is being established. When the enabled link is taken into use, the circuit 90 steps on to enable another link. Almost any selector device may be used to perform this function; a relay chain selector was actually used in the exemplary equipment.

It should be understood that the FIGS. 3–5 represent a simplified showing of the logical principles involved. While extremely simple and well known devices are shown, those skilled in the art will readily perceive that many other devices may accomplish the noted ends. For example, several simple rotary switches are shown, but the exemplary construction actually used equivalent relay chains. Thus, it is thought that the invention will be understood best by a description of calls incoming from and outgoing to a mobile subscriber station. The incoming call is described first.

INCOMING CALL

*Link selection.*—Before a call occurs, a relay 95 operates to initiate a sequence for selecting an idle link. Since the links are permanently associated with radio channels, this sequence also selects a channel. When the selection occurs, an idle tone relay 96' closes its contacts 97' to send an idle tone of 2000 c.p.s. through tone gate 75 and over the selected radio channel 57. All mobile subscriber stations automatically align themselves on that one channel. This way each subscriber station stands waiting for a call, if one should occur.

In greater detail, relay 95 is adapted to alternately close its contacts 96, 97 for driving a channel selector CS. When contacts 96 close, a motor magnet 98 operates to drive wipers 99, 100 one step. If the radio channel identified by that step is idle, the magnet 98 does not reoperate and the switch wipers 99, 100 stops. If that channel is busy, the magnet does reoperate to step the switch wipers 99, 100 in a hunting action until they reach an idle channel.

The wipers 99, 100 are shown by displaced dual wipers which follow each other. This symbology is explained by sketch "S" and indicates that the leading wiper 101 moves on to find and mark the next idle channel "I" while the trailing wiper 102 moves to monitor the channel M which was previously marked idle by the wiper 101. Thus, there is a "search" function (find an idle channel) and a "memory" function (control the call when the channel is in use). In the exemplary structure, this function was provided by relay chain having a slave memory relay at each step in the chain.

When the relay 95 closes the contacts 97, magnet 103 operates to drive the wipers 104, 105. The wipers 99, 100 and 104, 105 perform the same functions (respectively) except that the arrow A1 indicates that the wipers 99, 100 advance in one direction while the arrow A2 indicates that the wipers 104, 105 advance in an opposite direction. For traffic study purposes, it is as if the two switches 99, 100 and 104, 105 were scanning entirely different sets of links. Thus, the purpose of these two switches is to provide reliability through redundancy. The relay 106 operates through an OR gate G1 and a logic circuit L1 on each step of relay 95 to transfer its contacts 107. Thus, with each step of the channel selector CS, the wipers 99, 100 and 103, 104 alternately become effective.

During periods of low traffic density, a six minute timer T1 acts on logic circuit L1 to drive the channel selector CS once every six minutes to insure against a total loss of service if the channel selector should rest on a faulty channel. During periods of high traffic density, the logic circuit L1 inhibits this timer action every time that the relay 95 operates and OR gate G1 conducts.

*Calling condition.*—The calling mobile subscriber removes a handset (not shown) from the control head 62 (FIG. 1) and sends a carrier frequency or tone demand signal. If the control head is an automatic station (with dial), the demand signal is the same carrier frequency plus a guard tone (2150 c.p.s., for example).

Guard means are provided for initiating a sequence to inform the calling mobile station that it has in fact seized an idle radio channel. That is, two mobile stations could go off-hook at about the same time. One station is supposed to seize the channel. However, the other station could also latch on the same seized channel unless it is inhibited from doing so. This double seizure cannot be allowed. The guard function occurs this way. The mobile station sends a connect tone when it initiates a call. The tone is detected at 145 and relay 146 opens contacts **147*a*. This is the ground which was applied through diode D1, contacts 142, wipers 99, and contacts 107 to hold the idle tone relay 96′ operated. Relay 96′ opens contacts 97′** to remove idle tone. The mobile station detects the disappearance of idle tone within an extremely short measured period of time after it demanded a channel. Thus, it is aware that it has seized the channel.

Two stations may demand a channel almost simultaneously, but the probability is extremely slight that the time sequence could coincide closely enough to cause both mobile stations to latch onto the same idle channel. Rather one will latch and the other will drop back and try for the next channel.

The radio terminal receiver equipment 54 receives the carrier and perhaps guard tone also which is transmitted from the mobile station. Responsive thereto, a carrier frequency detector 109 provides an output for energizing a one-and-one-half second timer 110 and one input of an AND gate 112. If the guard tone is present, its passes through a band pass filter 68 to the tone detector circuit 76. There, a guard tone detector 114 responds to energize another input of the AND gate 112 which conducts. One result is that the timer 110 is inhibited at its terminal 115. (If guard tone is not present, AND gate 112 does not conduct; timer 110 is not inhibited; the call is immediately routed to a mobile operator position.)

The output of detector 109 also marks the seized link as busy at 116 and operates relay 95 for driving the channel selectors CS to seize the next idle link, (which may be "Link #N," for example). Recall that this occurs when the upper one of the dual wipers 99 steps on to idle mark the next channel. However, the lower of the dual wipers 99 remains associated with the link to provide a monitor or memory function.

Responsive to the output of the AND gate 112, a relay 117 operates. Contacts 118 close to demand service from the central office equipment. Contacts 119 close to demand priority. (A mobile station is served by the radio links which have limited transmisison capacity; therefore, it should not be kept waiting for service.) Contacts 120 close to operate relay 121 and complete a loop at 122 across tip and ring conductors T1 and R1 to the central office. The remainder of this loop may be completed through the heavily inked wipers T2, R2. In the central office, this has the usual switch seizing function. Contacts 123 open to break and acknowledge or answer supervision circuit which is effective during calls that are outgoing from the mobile station 59.

The demand signal, sent when contacts 118 close, associates the seized link with central office control equipment via the link allotter 130. The time of link allotting is not material to the invention. It may be prior to the receipt of a call; or it may occur at this time. To complete the association (whenever it occurs) link allotter switch 130 operates all of its wipers in unison. This operation of the wipers continues on a self-seeking or hunting basis until the link allotter 130 finds a marking on its bank **131*a* which corresponds to the position of the channel selector switch CS and a marking on its bank 131*b*** which corresponds to idle central office equipment. Thus, the central office equipment (left of dot-dashed line A) is now connected to the seized link circuit and associated with outgoing equipment by channel selector CS.

After the link allotter 130 has aligned itself and at the time when contacts 118 close to demand service, a signal is seat over wire 132 to demand a "Register." Simultaneously, the closed loop condition across talking conductors T1, R1 (which was completed at contacts 122) causes switching equipment in the central office also to demand the services of a register. Owing to the simultaneous nature of these demands, a single register R1 is assigned to serve the call being described.

The relay 134, energized via wire 132, closes its contacts 135 to start the register operation as soon as the link allotter repeats the demand signal which it received from contacts 118. As soon as the register is ready to proceed, it closes contacts 136.

Means are provided for giving the mobile subscriber priority over land lines. More particularly, the ground from contacts 119 is standing and waiting when the link allotter wiper 137 finds the link which is demanding service. Thus, a fast guard relay 138 operates to mark the register busy and guard it against seizure from a land line. The relay 138 is an extremely fast operating glass reed relay which will have closed its busy marking contacts (not shown) long before a conventional type relay can operate to seize the register from a land line.

Means are provided whereby the calling mobile control head automatically identifies itself to the central office. Each mobile control head in the system has an associated device for sending out a coded series of tone signals which are pre-set to the directory number that identifies the mobile subscriber station. The link circuit now commands this device to read out its pre-set code.

In greater detail, when the idle tone relay 96′ releases, contacts 143 close to prepare a path for sending a seize tone (which may be 1800 c.p.s.) over channel 57. It should also be noted that the idle tone relay 96′ released when contacts **147*a* opened and further that this same contact opening sent a signal to a delay circuit DC via wipers 100. There is a measured delay period which is long enough to accomplish all of the functions which have been described since contacts 147*a* opened. Thereafter, the delay DC times out. Then, the seize tone is sent over a path including contacts 143, tone gate 75, terminal 73, transmitter 53, and transmit radio channel 57. The device in the mobile station replies to the seize tone by sending out its pre-set directory number tone code. A connect tone detector 145 is tuned to respond to the frequency of this tone. Thus, each code pulse in the pre-set coded signal operates a relay 146. The relay 146 repeats these pulses by closing and opening its contacts 147 to send D.C. pulses through contacts 148 and wiper 149** into the register R1. The register stores each of the digit pulses as it is received. Thus, the central office equipment knows the identity of the calling station.

Means are provided for making a parity check of the station identifying digital signals as they are received. In greater detail, this feature may be understood best from a study of FIG. 7. When a channel is idle and assigned to serve the next call, the idle mark tone 150 is sent through contacts 97' of relay 96'. When the mobile control head goes off-hook guard tone 151 is sent to pull relay 117 and fast guard relay 138. Then the control head switches from guard tone 151 to connect tone 152 to operate relay 146 and indicate to the regitser R1 that automatic number identification will follow immediately. Next, the control head removes connect tone 152 and guard tone returns, as indicated at 151*a*. When the land equipment is ready to receive the automatic number identification; seize tone 153 is sent through contacts 143. The control head replies 154 by sending the first train of coded pulses of connect tone 152*a* etc. This is a decimal train of frequency pulses which identifies the first digit in the directory number of the control head. A pulse of guard tone is sent between every even and odd pulse of connect tone as shown at 151*b*.

Each connect tone pulse 152*a* operates and releases the relay 146, and the guard tone pulse operates and releases the relay 117. This, in turn, operates contacts 119 and, therefore, the fast guard relay 138. Thus, if the relay 138 fails to operate between every even and odd digit pulse, the transmission is faulty. The fast guard relay contacts 155 drive a flip-flop 156 to store a memory of the occurrence of each guard pulse. The register R1 compares the dial pulses received over wiper 149 and the guard pulses repeated at contacts 155 to make a parity check. If the parity check is correct, the register allows the call to proceed. Otherwise, the call is immediately routed to an operator position.

After the automatic number identification has been completed, the register R1 sends a signal through the wiper 157 to pull the relay 158. This opens contacts 148 and closes contacts 159 to connect the relay 160 to be controlled by relay 146.

Dial tone is forewarded when the central office is ready to receive dial pulses from the calling mobile subscriber. When he hears the tone, the mobile subscriber replies by dialing in a conventional manner. This causes successive pulses of connect and guard tone to be sent, as shown at 161 in FIG. 7. The guard tone enables the register to make a parity check, as explained above. Each pulse of connect tone is detected at 145 to operate and release the relay 146. Contacts 147 follow to operate and release relay 160. Each time that relay 160 operates, contacts 162 open to send an open loop pulse in the manner of a conventional telephone dial.

The register R1 responds to dial pulses as it usually responds to dial pulses. Then, it signals a marker M1 (via a wire 163) which selects a desired switch path to a called line. Once the selected path is completed, it is held operated as long as the ground 164 continues to appear on the conductor 165. When the handset is returned to its cradled position on the control head, this ground 164 is removed and the path is dropped. The link is thus adapted to make the radio channel free for the use of another call as promptly as possible after the mobile subscriber has hung up.

CALL TO MOBILE SUBSCRIBER

A subscriber may be called in either of two ways—from a manual position or from an automatic switching system. The manual position call is used when the mobile subscriber is equipped with an old style mobile station. The automatic switching call is used when the mobile subscriber is equipped with a new style mobile station (the so-called IMTS).

*Manual call.*—This type call is completed to the old style mobile telephone stations. It is recognized as a manual call because the directory number of the mobile station causes the central office equipment to seize the mobile operator position.

To initiate a call from a manual position, the operator throws a line key 170. Contacts 171 close to apply a potential to conductor 172 for the period of time required to reset the mobile equipment to a normal position. This period of time is measured by the discharge of capacitor 173. Responsive to the discharging current, relay 174 closes contacts 175 to send a pulse of 1500 c.p.s. to the mobile station. The control head replies by reseting itself. After the capacitor 173 discharges, relay 174 restores. Then contacts 177 open to remove the capacitor 173 from the line 172.

Later the operator uses any convenient dial 178 to send dial pulses through contacts 179, 171 for operating the frequency shift relay 174. This relay sends tone pulses to operate the station selector devices associated with the control heads of all mobile stations in the area. One control head recognizes the code of tune pulses as its own code, and the call is completed.

*Automatic calls.*— For calls to the newer style mobile stations to which the invention relates, the directory number of the call mobile subscriber station causes a switch train to seize the subscriber's line circuit 180 in the central office.

Responsive to seizure, the line circuit 180 sends a signal over conductor 181 to operate an "outgoing" relay 182 in the link chain circuit 90. When it operates, the relay 182 sends a signal through diode D2, and contacts 142 to release one of the idle tone relays 96' that is then operated. Contacts 184 close and relay 95 operates to drive the channel selector CS in its search for the next idle channel. By looking at sketch S, it will be apparent that the channel wiper steps on for the purpose of idle marking another channel, but that a memory connection remains for monitoring the channel which has just been seized.

The calling subscriber dials the directory number of a called mobile subscriber station. In a conventional manner, this subscriber action controls the marker M1 to, in turn, control the switching functions. A sender S1 also operates in its customary manner to send D.C. pulses over conductor 187 and through the memory or monitor wiper of the channel selector CS to pulse the relay 96.

Each time that a D.C. dial pulse occurs, relay 96' shifts the frequency from 1800 c.p.s. to 2000 c.p.s. All mobile receivers follow these dial pulses, and one recognizes its code. This results in the transmission of an acknowledge tone from the mobile receiver over the radio channel 58 to the tone detector 76. There, a detector 190 responds and sends a signal to a relay 191 which operates intermittently under the control of a low speed interrupter. The result is that contacts 192 open and close at a slow rhythm to apply the output of a high speed interrupter 193 to the winding of the frequency shift relay 174. Thus, an interrupted warble tone is sent out. The mobile station recognizes this as a ringing signal and applies the local power supply to a signal which calls the subscriber to this telephone.

The mobile subscriber answers and sends carrier plus guard tone. The AND gate 112 conducts and relay 117 operates. Contacts 123 open; relay 191 stops its low speed rhythmic operation; ringing has then been tripped. Contacts 120 close to operate relay 121 and close contacts 122 which completes the loop across the talking conductors T1, R1. This provides the well known closed loop answer supervision to the central office.

While the principles of the invention have been described above in connection with specific apparatus and applications, it is to be understood that this description is made only by way of example and not as a limitation on the scope of the invention.

I claim:

1. A land-to-mobile telephone system comprising a switching office, a plurality of mobile telephone stations, radio links between said office and said mobile stations, a plurality of line circuits associated with said office, there being a line circuit for each of said mobile subscriber stations, link means interposed between said office and said radio links, means in said link means for applying an idle mark signal to an available one of said radio links, and means responsive to the assignment of a radio link to serve a call for initiating a timed sequence of events to inform the mobile station serving said call that it has, in fact, been assigned to said link.

2. The system of claim 1 and means in said office for giving priority to calls received from said mobile subscriber stations.

3. The system of claim 1 and a channel selector switch for selecting the one of said radio links which is to have said idle mark signal applied thereto, means responsive to the assignment of said one radio link to serve said call for driving said channel selector to select the next available of said radio links and applying said idle marking thereto, and means in said channel selector for maintaining a monitor and memory connection with said one radio link.

4. The system of claim 3 and means effective during periods of low traffic density for periodically driving said channel selector to change the channel to which said idle marking is applied.

5. The system of claim 4 and dual means for making said periodical changes of said idle marking, and means for driving one of said dual means in a first direction and the other of said dual means in an opposite direction, whereby each of said means effectively scans a different group of said radio links.

6. The system of claim 1 and means in said link circuit for converting signals received from said office into signals used at said mobile stations and signals sent from said mobile station into signals used at said central office.

7. The system of claim 6 and means in said office parity checking signals as they are received from the mobile stations.

8. The system of claim 6 wherein the signals sent from said mobile stations comprise trains of pulses of a first frequency having other pulses of another frequency interspersed at fixed intervals between the pulses of said first frequency, and means at said office for comparing the positions of the pulses of said two frequencies to make a parity check of the pulse train as it is received.

9. A land-to-mobile telephone system comprisng a switching office, a plurality of mobile telephone stations, radio links between said office and said mobile stations, a plurality of line circuits associated with said office, there being a line circuit for each of said mobile subscriber stations, link means interposed between said office and said radio links, means in said link for applying an idle mark signal to one of said radio links, channel selector switch means for selecting the one of said radio links which is to have said idle mark signal applied thereto, means responsive to the assignment of said radio link to serve said call for driving said channel selector to select the next one of said radio links which is then marked idle, and means in said channel selector for maintaining a monitor and memory connection with said one radio link.

10. The system of claim 9 and there being dual means for selecting and applying said idle marking, means for periodically driving said channel selector to change the channel to which said idle marking is applied during periods of low traffic density, and means for driving one of said dual means in a first direction and the other of said dual means in an opposite direction.

11. A land-to-mobile telephone system comprising a switching office, a plurality of mobile telephone stations, each of said mobile stations being identified by a code, radio links between said office and said mobile stations, a plurality of line circuits associated with said office, there being a line circuit for each of said mobile subscriber stations, link means interposed between said office and said radio links, means in said link for applying an idle mark signal to one of said radio links, means responsive to seizure of an idle radio link for initiating a time sequence comprising a removal of said idle mark followed in succession by an application of a connect tone, removal of said connect tone, and an application of a seize tone, and means responsive to the appearance of said seize tone for causing the mobile station serving the call to automatically transmit its identification code.

12. The system of claim 11 wherein the code comprises a train of pulse signals sent from said mobile stations, said pulses having a first frequency with other pulses of another frequency interspersed at fixed intervals between the pulses of said first frequency, and means at said central office for comparing the positions of the pulses of said two frequencies to make a parity check of the pulse train as it is received.

13. The system of claim 11 and means for making a parity check of the identification signals as they are received.

14. A land-to-mobile telephone system comprising a land based office, a plurality of mobile telephone stations each identified by a numerical code, radio links between said office and said mobile stations, a plurality of line circuits in said office, there being a line circuit for each of said mobile subscriber stations, link means interposed between said office and said radio links, means in said link for applying an idle mark signal to one of said radio links, and means responsive to a disappearance of said idle mark and an appearance of another tone for causing a mobile station serving a call to automatically transmit its numerical identification code.

15. The system of claim 14 wherein said code is in the form of the trains of pulses of a first frequency with other pulses of another frequency interspersed at fixed intervals between the pulses of said first frequency, and means at said office for comparing the pulses of said two frequences to make a parity check of the pulse train as it is received.

References Cited

UNITED STATES PATENTS 3,173,996 3/1965 Rypinski ------------ 179—41

KATHLEEN H. CLAFFY, *Primary Examiner.*

A. H. GESS, *Assistant Examiner.*